United States Patent
Yoon et al.

(10) Patent No.: US 12,368,686 B2
(45) Date of Patent: Jul. 22, 2025

(54) METHOD AND SYSTEM FOR IDENTIFYING MESSENGER COUNTERPART IN ORDER TO PROVIDE PERSONALIZED SERVICE

(71) Applicant: INDENT CORP. CO., LTD., Seoul (KR)

(72) Inventors: Tae Seok Yoon, Seoul (KR); Gyun Ho Park, Seoul (KR); Se Hyeon Park, Seoul (KR)

(73) Assignee: INDENT CORP. Co., Ltd., Seoul (KR)

( * ) Notice: Subject to any disclaimer, the term of this patent is extended or adjusted under 35 U.S.C. 154(b) by 0 days.

(21) Appl. No.: 17/999,188

(22) PCT Filed: Feb. 25, 2021

(86) PCT No.: PCT/KR2021/002343
§ 371 (c)(1),
(2) Date: Nov. 17, 2022

(87) PCT Pub. No.: WO2021/235657
PCT Pub. Date: Nov. 25, 2021

(65) Prior Publication Data
US 2023/0208786 A1 Jun. 29, 2023

(30) Foreign Application Priority Data
May 19, 2020 (KR) .................. 10-2020-0060032

(51) Int. Cl.
*H04L 51/02* (2022.01)
*G08B 29/02* (2006.01)
*H04L 51/18* (2022.01)

(52) U.S. Cl.
CPC .............. *H04L 51/02* (2013.01); *G08B 29/02* (2013.01); *H04L 51/18* (2013.01)

(58) Field of Classification Search
CPC ......... H04L 51/02; H04L 51/18; H04L 51/04; G06Q 50/30
See application file for complete search history.

(56) References Cited

U.S. PATENT DOCUMENTS

| | | | |
|---|---|---|---|
| 2009/0119264 A1* | 5/2009 | Bostic | H04M 3/493 |
| 2012/0158161 A1* | 6/2012 | Cohn | G08B 29/02 |
| | | | 700/90 |
| 2017/0324586 A1* | 11/2017 | Kim | H04L 51/06 |

FOREIGN PATENT DOCUMENTS

| | | |
|---|---|---|
| KR | 10-2007-0092690 | 9/2007 |
| KR | 2015-0088948 A | 8/2015 |

(Continued)

*Primary Examiner* — David R Lazaro
*Assistant Examiner* — Mariegeorges A Henry
(74) *Attorney, Agent, or Firm* — Maine Cernota & Curran

(57) ABSTRACT

Systems and methods for identifying a counterpart of a messenger. An example method includes receiving an action signal of a user from the outside by a communication unit. User information related to the user is read from a database. An initial message and a response message including an identification indicator for identifying the user is determined based on the user information. A messenger server is requested to open a conversation channel, in which the user is designated as a counterpart, to transmit the initial message and to output the response message by the communication unit. The response message is received by the communication unit. The identification indicator output in the received response message and specifying a person corresponding to the identification indicator is checked as the counterpart.

17 Claims, 10 Drawing Sheets

(56) References Cited

FOREIGN PATENT DOCUMENTS

| KR | 2016-0076405 A | 6/2016 |
|---|---|---|
| KR | 10-2016-0077621 A | 7/2016 |
| KR | 10-1712774 | 3/2017 |
| KR | 2018-0093357 A | 8/2018 |
| KR | 2019-0037893 A | 4/2019 |
| KR | 10-2019-0106542 A | 9/2019 |
| KR | 2020-0045815 A | 5/2020 |

* cited by examiner

METHOD AND SYSTEM FOR IDENTIFYING MESSENGER COUNTERPART IN ORDER TO PROVIDE PERSONALIZED SERVICE

BACKGROUND

Field of the Invention

The present invention relates to a user identification method, more particularly, a user identification method configured to provide a personalized service by accurately identifying a counterpart of a messenger in any conversation environment.

Description of the Related Art

As portable terminals always on an internet such as smart phones or table PCs are distributed, a variety of services is being released for convenience of users through such portable terminals. Among these services, an interactive messaging service allowing users to send and receive messages in real time based on the internet is widely used. As such, as the use of the interactive messaging service increases, diverse additional services such as advertisement or marketing using the interactive messaging service are also introduced.

Recently, a Chatbot service that provides answers through conversation with people in ordinary language through artificial intelligence in the interactive massaging services has emerged. When a user inputs various queries as an interactive massage through an interactive messaging application, the chatbot service is a service to analyze the interactive message and execute an event for the interactive message, thereby providing an appropriate answer to the query.

Conventionally, chatbot has been used for various services, but in some messenger services, even if the chatbot sends a first message by specifying a counterpart's ID, information of the counterpart may be randomized when a channel is opened and the messenger server delivers the counterpart's answer. Therefore, unlike when sending the initial message, when an answer was received, an administrator server to operate the chatbot service cannot specify the user who provided the answer. In this case, there is a problem in that the administrator server should receive a service depending on the content of a conversation with the user or has to directly receive personal information input from the user in order to know who the user is.

The administrator server may provide a personalized service through the messenger only when specifying what kind of users the counterparts are. Conventional chatbots request the user to directly input a variety of information for identifying individuals in order to provide the personalized service. This makes the user feel inconvenient or cumbersome, hence reducing the probability for the user to access the services to be provided by the administrator.

Alternatively, some of the conventional chatbots merely provide a simple service that can be provided even if a user is not specified rather than receiving input of personal information from the user.

SUMMARY

Technical Problem to be Solved

The present invention has been proposed to solve, as an example, the above problems. Specifically, an object of the present invention is to provide a user identification method capable of specifying a user in a case where an administrator to provide a chatbot service opens a conversation channel, even if a messenger server processes ID of a counterpart user into random numbers ("randomize").

Technical problems to be solved, that is, the objects to be achieved by the present invention are not limited to the technical problems mentioned above, and various technical tasks may be included within the range apparent to those skilled in the art from the content to be described later.

Technical Solution

A method for identifying a counterpart of a messenger according to an embodiment of the present invention may include: receiving an action signal of a user ("user action signal") from the outside by a communication unit; reading user information related to the user from a database; determining an initial message and a response message including an identification indicator for identifying the user based on the user information by a processor; requesting a messenger server to open a conversation channel, in which the user is designated as a counterpart, to transmit the initial message and to output the response message by the communication unit; receiving the response message by the communication unit; and checking the identification indicator output in the received response message and specifying a person corresponding to the identification indicator as the counterpart by the processor.

The identification indicator is information specifying a user and preferably includes different values designated for respective persons. Further, when the initial message is transmitted, the response message is automatically output as a message at the user side in response thereto and may be output when the user responds according to a response-inducing means of the initial message.

In an embodiment, the determination of the response message may include: constructing a data combination capable of identifying a user among the user information; designating an identification indicator corresponding to the data combination; and generating an initial message including a response-inducing means and then determining the content of the response message including the identification indicator.

In an embodiment, the step of designating the identification indicator may further include designating a query code corresponding to the data combination, wherein the identification indicator corresponds to the query code.

In an embodiment, the initial message may include the query code, and the response message may include the identification indicator corresponding to the query code.

In an embodiment, the action signal is a signal indicating online that a predetermined user action has been completed. For example, if the user ordered a product and received delivery thereof, information "delivery completed" may be the action signal. That is, upon receiving an action signal indicating that the delivery is completed, an administrator system may transmit an initial message requesting an arbitrary action to the user.

A system for identifying a counterpart of a messenger according to an embodiment of the present invention may include: a database for storing user information and diverse data; a processor for determining an initial message and a response message that includes an identification indicator for identifying a user, based on the user information; and a communication unit that, upon receiving a user action signal from the outside, requests a messenger server to open a conversation channel, in which the user is designated as a counterpart, to transmit the initial message and to output the response message.

The identification indicator is information for specifying a user, and preferably includes different values designated to respective users.

The response message may be automatically output as a message at the user side in response to the transmission of the initial message, specifically, may be output when the user responds to the response-inducing means of the initial message. Further, when the communication unit receives a response message of the user, the processor may check the identification indicator output in the received response message so as to specify the user corresponding to the identification indicator as a counterpart.

In an embodiment, when determining the response message, the processor may construct a data combination capable of identifying the user among the user information, designate an identification indicator corresponding to the data combination, generate an initial message including a response-inducing means, and then, determine the content of the response message including the identification indicator.

In an embodiment, when determining the response message, the processor may further designate a query code corresponding to the data combination along with the identification indicator and the identification indicator may correspond to the query code.

In an embodiment, the initial message may include the query code, and the response message may include the identification indicator corresponding to the query code.

In an embodiment, the action signal may be a signal indicating online that a predetermined user action has been completed.

A method for identifying a counterpart of a messenger according to the present invention may include: receiving a user action signal from the outside by a communication unit; reading user information related to the user from a database; determining an initial message and a response message including an identification indicator for identifying the user based on the user information by a processor; requesting a messenger server to open a conversation channel, in which the user is designated as a counterpart, and to transmit the initial message by the communication unit; receiving the response message by the communication unit; and checking whether the identification indicator exists in the received response message and, if the identification indication exists, specifying a person corresponding to the identification indicator as the counterpart by the processor.

In an embodiment, the determination of the identification indicator may include determining an initial message that includes a query code, as well as an identification indicator corresponding to the query code, based on the user information, by the processor.

Each of the query code and the identification indicator is information for specifying a user, and it is preferable that different values are designated for respective users.

A server system for identifying a counterpart of a messenger according to an embodiment of the present invention may include: a database for storing user information and diverse data; a processor for determining an identification indicator based on the user information; and a communication unit that, upon receiving the user action signal from the outside, requests a messenger server to open a conversation channel, in which the user is designated as a counterpart, and to transmit the initial message, wherein the identification indicator is information specifying the user and includes different values designated for respective users.

When the communication unit receives a response message of a user, the processor may check whether an identification indicator exists in the response message and, if the identification indicator exists, may specify a person corresponding to the identification indicator as the counterpart.

In an embodiment, the processor may determine an initial message including a query code, as well as an identification indicator corresponding to the query code, based on the user information.

The query code and the identification indicator are information for specifying a user, and it is preferable that different values are designated for respective users.

A program for identifying the counterpart of the messenger stored in a non-transitory readable medium according to an embodiment of the present invention may include an algorithm designed to execute identification of the counterpart of the messenger in combination with a computer as hardware.

Effect of Invention

According to an embodiment of the present invention, when an administrator to provide a chatbot service opens a conversation channel through a messenger server, it is possible to specify who the counterpart is even if the messenger server randomizes ID of the counterpart user, therefore, a personalized service can be provided.

DETAILED DESCRIPTION

The foregoing and further inventive aspects are embodied through the embodiments described with reference to the accompanying drawings. However, the embodiments described below are merely exemplary, and are not intended to limit the scope of the present invention to only the described embodiments. In addition, various combinations are possible within the embodiments or with each other as long as there is no contradiction between the components in the respective embodiments.

Further, when a part "includes" a certain component, this means that this component is necessarily included regardless of other components, and is not intended to exclude the possibility of including other components.

Further, in the entire specification, when a certain part is said to be "connected" with another part, it is not only "directly connected" but also includes a case where the part is "indirectly (or electrically) connected" with another part while interposing a different element therebetween.

Further, in the entire specification, when it is said that certain information is "transmitted", this includes not only the case of "direct transmission" but also the case of "indirectly (or secondary) transmission" through other components in the middle thereof.

Further, in the entire specification, some of operations or functions described as mapping or matching with a terminal may be interpreted as mapping or matching a unique number of the terminal, which is the identification data of the terminal, or personal identification information.

Further, in the entire specification, products may include a variety of kinds that can be purchased online, such as delivery food, rental products and services in addition to goods.

Hereinafter, the present invention will be described in detail with reference to the accompanying drawings.

In the present invention, the identification system 300 may identify a counterpart user in all fields in which chatbot is utilized, therefore, can be utilized in all fields for providing personalized services. However, in order to help understanding, how to implement user identification in a review management system will be described. However, the scope of rights claimed by the present invention is not particularly limited to the review management system described above.

Figure 1:
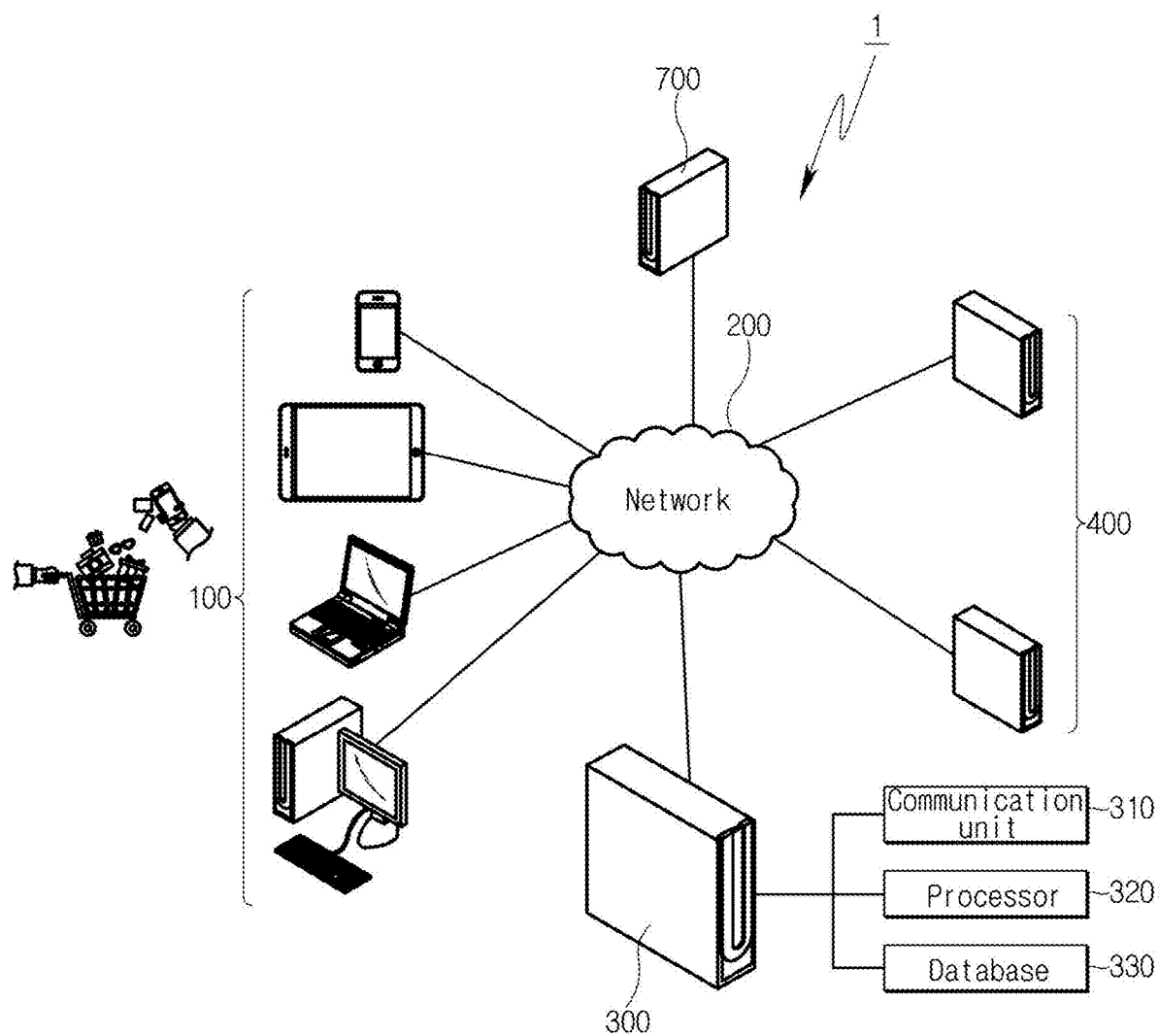
FIG. 1 is a diagram schematically illustrating a network according to an embodiment of the present invention.

FIG. 1 is a diagram schematically illustrating an interaction between a chatbot-based identification system and external devices according to an embodiment of the present invention.

Referring to FIG. 1, the identification system 300 interacts with a user terminal 100, at least one external server 400, and a messenger server 700 through a network 200.

Referring to FIG. 1, the user may purchase a product from at least one external server 400 using the user terminal 100 and then receive the product, while a chatbot provided by the identification system 300 may upload a review for the purchased product through a channel of a messenger accessed to the user. Herein, the channel is a space opened by the messenger server 700 so that a user and an identification manager can chat with each other wherein at least a chat room is included, broadly, a resource allocated for conversation between two subjects in the messenger server 700 may be included.

In other words, the identification system 300 or the chatbot provided by the identification system 300 may request the messenger server 700 to open a channel connected with the user, and the messenger server may open a conversation channel between the user and the chatbot.

When the user is identified, the chatbot may inquiry and display purchase histories for various products in a plurality of shopping malls (external servers), and the user can select any one of the delivered products and upload a review to the channel. In order to enable such a service as above, the chatbot should know exactly who it is talking to (that is, the counterpart).

It is supposed that the identification system 300 receives and possesses shopping histories of 10,000 users as data from a plurality of external servers 400. That is, users may exist from No. 1 to No. 10,000, each of which has an ID on the messenger server and may also have a mobile phone number linked to the ID. If the phone number of user No. 1 is 1234-1111 and ID is abcd, an administrator of the identification system may designate the phone number 1234-1111 or ID abcd and then start the chatbot. That is, the phone number and ID are the unique key (K) of the user. The user No. 1 will receive a message from the chatbot.

In the case of some messengers, at a moment that a first user sends a message, the identification system 300 may receive the message, but a key value of the user received by the system may be a random number-processed character string not the unique key (K). The identification system 300 is hardware that implements software such as a counterpart identification program, and is not capable of recognizing a counterpart like as a user or an administrator sees a chatting screen. The identification system 300 has no choice but to trace back using the user's key value sent by the messenger server 700 in order to recognize who the counterpart is. Therefore, if the unique key (K) of the user is returned after random number processing, it is impossible for any system to recognize it as a specific user. The present invention proposes a method or distinguishing a user even when a random number-processed (that is, randomized) character is received as a key value of the user, which is embodied in FIGS. 3 to 10.

In an embodiment of the present invention, the user terminal 100 may be implemented as a computer that can access a remote server or terminal through a network or a wireless communication device that guarantees portability and mobility.

The identification system 300 may receive product order information in real time from a plurality of external servers 400 that are affiliated shopping mall servers. Specifically, when a user orders a product from at least one shopping mall and the product is shipped, the identification system 300 may receive the product order information from the external server 400 in real time, and also receive delivery completion information from the external server 400 or a separate delivery information server 800. Herein, the delivery completion information may be a kind of user action signal. The identification system 300 may select a driving method when received the user action signal.

However, according to the present invention, since a product does not mean only a product, it would be obvious that, when the product is a service or delivery food, those skilled in the art may receive information on the completion of the service from the delivery information server 800 by the identification system 300 in real time. In this case, the completion of service execution may be a kind of user action signals.

The product order information may include a name of the orderer, delivery address information, an order number, a name of a shopping mall where the product was purchased, a hosting company, and the like. The product order information may be included in the user information and may construct a part of data forming the user information. That is, the user information may include a variety of information including a user name, phone number, a name of the shopping mall where the product was purchased, a list of purchased goods, address, a name in English, and the like. In order to identify the user, the above information may be utilized as a data combination. Such data combination may correspond to a query code (Q) and an identification indicator (I), which will be described later, and the identification indicator (I) may be used for user identification.

When the user terminal 100 accesses the channel, the identification system 300 may identify the user and inquire product order information corresponding to the user. The product order information is information transmitted in real time from at least one external server 400, for examples, different servers of various shopping malls, and may include various information such as a name of the orderer, product name, shopping mall name, delivery address information, order number, a name of hosting company, etc. That is, regardless of shopping malls were are origins of the various products purchased by one user or purchasing time, if the product was purchased from a shopping mall affiliated with the identification system 300, the identification system 300 can inquire the product order information.

The identification system 300 may continuously monitor delivery information and, when it obtains the information that delivery is completed, the identification system 300 or a chatbot driven by the identification system 300 may request a message server 700 to open a channel. When the chatbot sends a message requesting review upload to the user through a messenger installed in the user terminal 100, the user can easily upload the review to the channel through the user terminal 100.

According to an embodiment of the present invention, the identification system 300 and one external server 400 may be operated by the same entity. For example, if a specific shopping mall company has its own server and introduces the identification system 400 to enable operation on the own server, customers of the own shopping mall can directly experience a chatbot interface according to an embodiment of the present invention.

According to an embodiment of the present invention, the identification system 300 and a plurality of external servers 400 may be operated by different entities.

Figure 2:
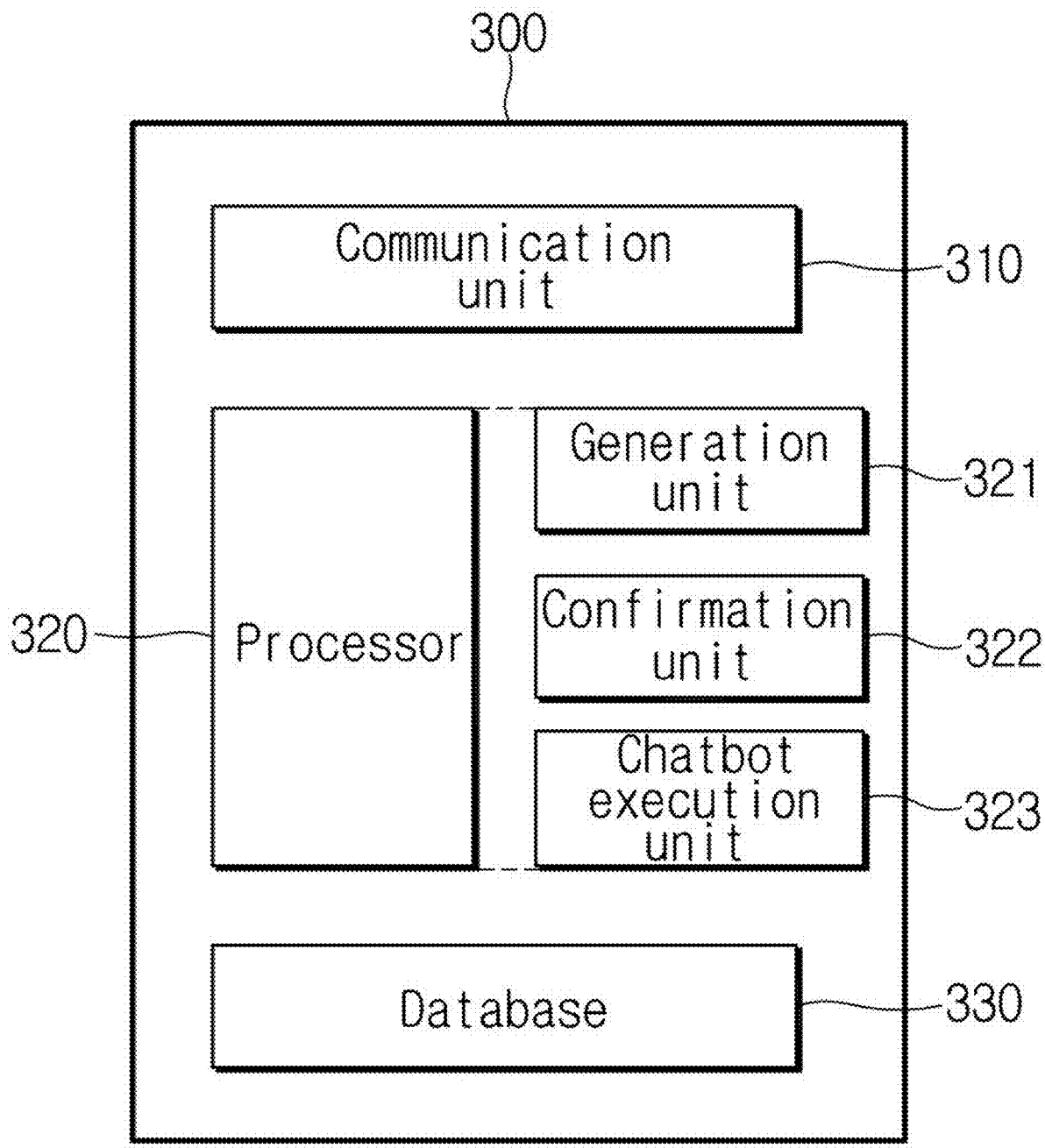
FIG. 2 is a block diagram illustrating a detailed configuration of an identification system according to an embodiment of the present invention.

FIG. 2 is a block diagram illustrating a detailed configuration of the identification system according to an embodiment of the present invention. Referring to FIG. 2, the identification system 300 may basically include a communication unit 310, a processor 320 and a database 330, wherein the processor 320 may include a generation unit 321, a confirmation unit 322 and a chatbot execution unit 323. The generation unit 321, the confirmation unit 322 and the chatbot execution unit 323 may be each part of the processor 320 in which each function is implemented in a hardware manner, but it is not excluded that each component may be formed by a separate processor.

The communication unit 310 may receive product purchasing information of a user from at least one external server 400. When the communication unit 310 receives new product purchase information for a first product, the identification system 300 may inquire all of n-th products, such as second product, third product, etc. that were purchased by the user. That is, when the communication unit 310 receives product purchase information on the first product, the identification system 300 may acquire the identification indicator (I) from a message of the user to thus recognize the user, and may inquire all of purchase histories of the identified user in the shopping malls as a purchasing place where the user has purchased the products. That is, a personalized service can be provided.

Information inquiry on the past purchase history may be formed after purchasing the first product. Alternatively, since communication between the identification system 300 and at least one external server 400 is conducted in real time, it may be inquired in advance before the purchase of the first product, and the identification system 300 may search again for information stored in a database used thereby.

The generation unit 321 may acquire user information from the product purchase information. The identification system 300 may obtain the user information, request to open a channel with the user, and transmit a necessary message.

The generation unit 321 may create a query code (Q) for specifying a user and an identification indicator (I) matching the query code. The query code (Q) and the identification indicator (I) are information corresponding to the user and stored in the database of the identification system 300.

Utilizing the query code and the identification indicator will be described in detail later.

The confirmation unit 322 may monitor delivery information of the purchased product in real time. Specifically, the confirmation unit 322 may receive a way bill number and inquire about the delivery status in real time, or receive "delivery completed" information directly from at least one external server 400, that is, the shopping mall server or the delivery information server 800. The delivery information server 800 may be a separate server or a component included in the identification system 300.

In an embodiment, the information confirmed in the confirmation unit 322 may include user's action signal 1000 including the delivery completion information. That is, the delivery completion 1001 may be only a small portion of the action signal 1000, and the action signal 1000 may be determined according to the purpose of the identification system 300.

In an embodiment, the chatbot execution unit 323 may instruct the chatbot to open a channel with the user when a preset period elapses after the user action signal 1000 is received. The preset period may be immediately after delivery completion 1001 or after a predetermined time elapses therefrom. Even if the action signal is a website button click 1002 or a terminal touch 1003, it can be applied to the same as described above.

For example, when the delivery of the shipped product is completed, the identification system 300 may check the delivery completion and then, after a preset period elapses, the chatbot may open a messenger channel in the user terminal. The preset period includes immediately after delivery is completed, and may mean, for example, a time period in minutes, hours, and days after delivery is completed.

After the confirmation unit confirms the delivery completion and a preset period elapses, the chatbot outputs the query code (Q) to the channel of the user terminal and induces output of the identification indicator (I) so that the chatbot execution unit 323 can identify the user from the identification indicator (I) displayed in the user's message.

Specifically, when the confirmation unit 322 checks the delivery completion, the chatbot execution unit 323 may directly or indirectly transmit an initial message containing or not containing the query code through the channel.

When a message of the user is input to the channel after transmitting the initial message to the channel, the chatbot execution unit 323 may be designed to output the user's message including the identification indicator.

Figure 3:
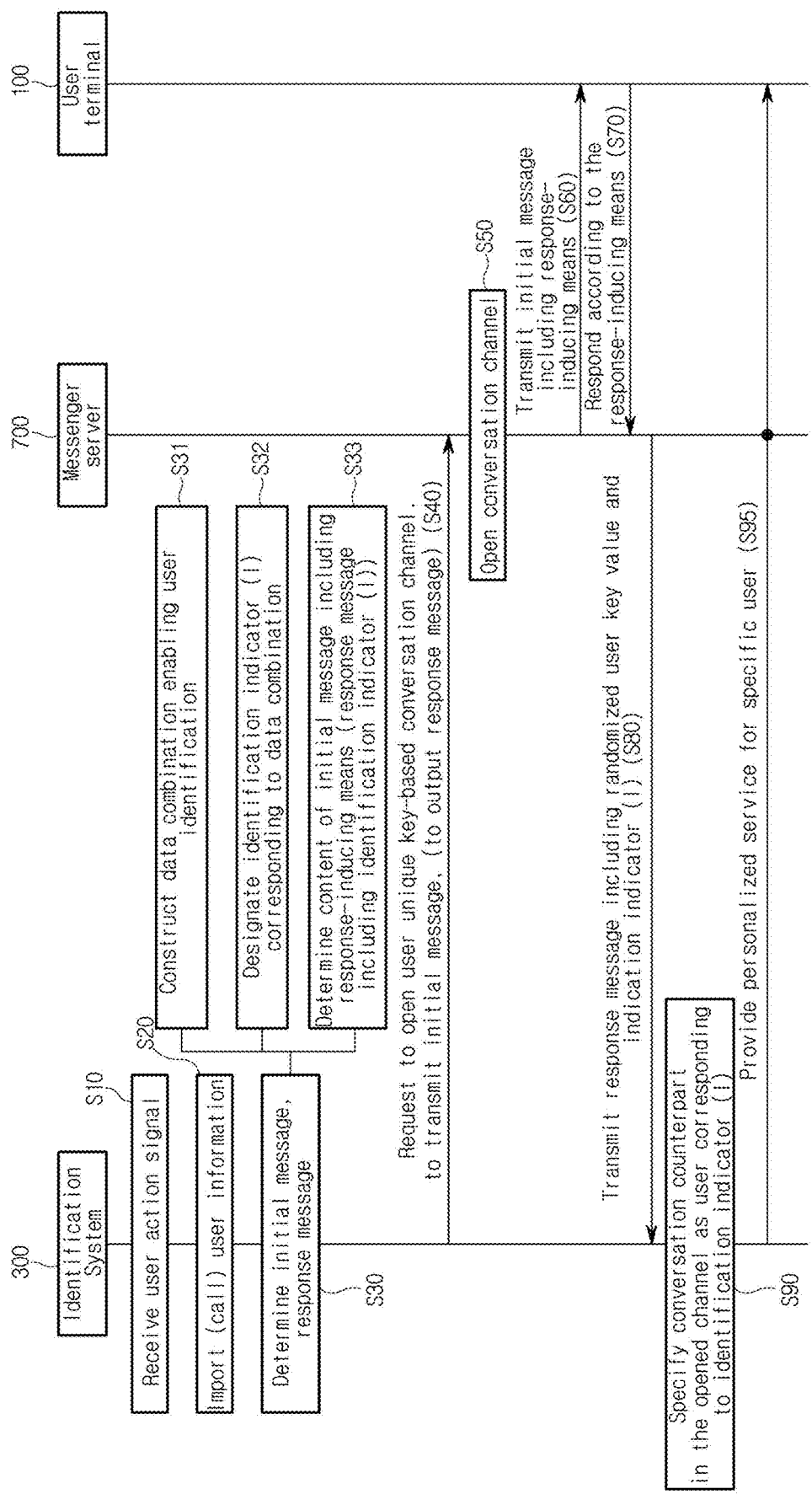
FIG. 3 is a flowchart illustrating a process of a method for identifying a counterpart of a messenger according to an embodiment of the present invention.

FIG. 3 is a flowchart illustrating a process of the method for identifying a counterpart of a messenger according to an embodiment of the present invention.

The identification system 300 may interact with the messenger server 700 and the user terminal 100. In other words, the user terminal 100 and the identification system 300 may communicate with each other while interposing the messenger server therebetween.

When receiving the action signal (A) of the user (S10), the identification system 300 may import (or call) the user information 90 of the user who has detected action signal (A) (S20), and may determine an initial message and a response message to be sent to the user (S30). Herein, the order of steps of S10 to S30 may be altered. For example, user information may be synchronized with the identification system 300 from the external servers 400 at any time and, in a predetermined state of the initial message and the response message, may receive the user action signal (A).

The processor of the identification system 300 defines the initial message, wherein the response message may be defined according to the type of user's message that is required to be obtained by the administrator of the identification system 300, otherwise, may depend on input of the user without definition. Since the initial message is usually necessary due to the nature of the chatbot conversation, it is preferable that the initial message is defined at this stage. However, in a case where the messenger server 700 allows to output first the user's message—in any form—by the request of the identification system 300 when opened a channel, the initial message may not be defined.

First, when a response message is defined in advance, both of an initial message and a response message may be defined (S30) after the user information is imported (or called) (S20). In this stage, the identification system 300 may construct all user-related data that can identify the user, that is, a data pool, and may construct a unique combination of data so that the processor can identify the user (S31).

The data pool may include all user-related information obtainable from external servers 400 such as, for example, product name purchased by the user, shopping mall name, shopping mall address, shopping mall-related hosting company, user name, nickname, ID for each shopping mall, user's phone number, user's birthday, and the like. In such a data pool, data combinations may be constructed according to the type, number, and/or order of user information previously designated by the administrator.

For example, it is supposed that there is a data pool of the following user.

Product Name: P Cat Food
Store Name: Amazon.com
Shopping mall address: www.amazon.com
Hosting company: Cafe24
User name: Yoon Tae-seok
Nickname: Morgan
Amazon ID: Morgan.yoon
Phone: 010-1234-5678
User birthday: Oct. 10, 1995

Based on the above user data pool, there are many ways to construct data combinations. If the administrator determines that the combination of hosting company, user name, phone number and birthday is best to specify and distinguish a user from other users, the combination of the above four information may become a data combination for identifying the above user (C).

The processor of the identification system 300 may match at least one of numerous letters, numbers, symbols, and images already stored in the database to the above data combination (C) and then store the same. At least one of the numerous letters, numbers, symbols and images already stored in the database may be used as an identification indicator (I) to be displayed in a chat window to distinguish a user. Further, at least one of the numerous letters, numbers, symbols and images already stored in the database may be a query code (Q) to be displayed to the user by the chatbot of the identification system 300 so as to obtain the identification indicator (I).

The identification indicator (I) may be a single character but, as a plurality of elements are combined, it becomes easier to distinguish users so that the elements constituting the identification indicator (I) are preferably in plural. The query code (Q) may be a single character but may also be a plurality of characters.

Figure 10:
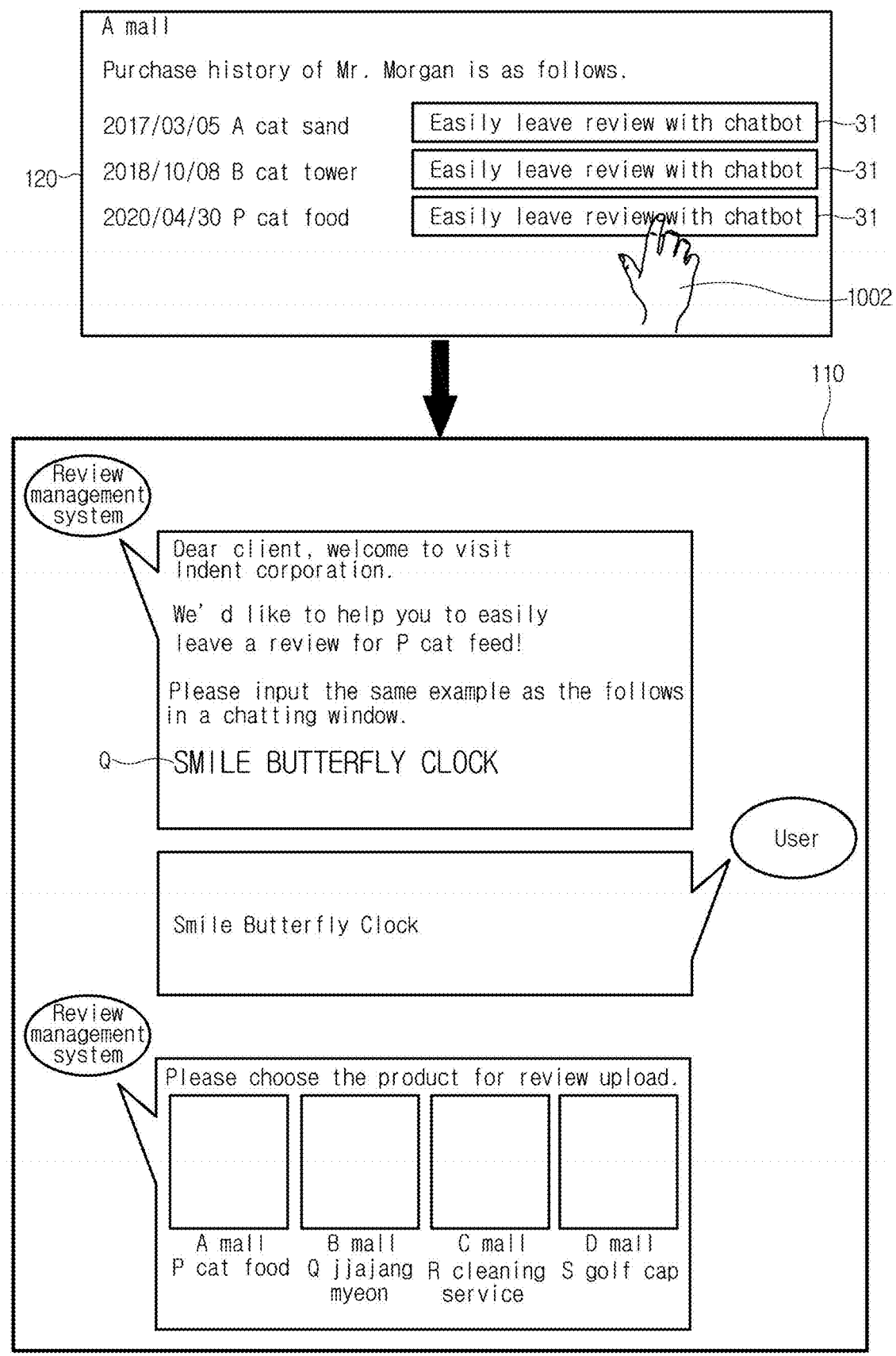
FIG. 10 is a further diagram illustrating a process of user identification proceeding in a user terminal when the identification system according to an embodiment of the present invention receives a user click action on an external website as a user action signal.

The data combination (C), the identification indicator (I) and the query code (Q) may be different but, if there is no difficulty in identifying the user even when the above conditions are the same to each other, the data combination (C), the identification indicator (I) and the query code (Q) may be equal to each other. For example, the shopping mall 11, order number 12 and orderer name 13 of FIG. 7 may be an example of the data combination (C) as user information, but at the same time, may become a query code (Q) and an identification indicator (I). As another example, since the query code (Q) of FIG. 10 is for outputting the user's identification indicator (I), the query code (Q) and the identification indicator (I) may be the same in this case.

When the initial message and the response message or the initial message are (is) determined, the identification system 300 may request the messenger server 700 to open a conversation channel based on the user's unique key K, which is generally called an ID or corresponds to the ID and, at the same time, request the transmission of an initial message. In this stage, in order to automatically output the response message including the identification indicator, it is possible to request the output of the response message along with the initial message transmission (S40).

The messenger server 700 may open a conversation channel according to the request of the identification system 300 (S50). That is, the messenger server 700 may grant the user a right of accessing the identification system 300 on its own system.

Once the conversation channel is opened, the messenger server 700 may transmit an initial message to the user terminal as requested by the identification system (S60). The initial message may include a response-inducing means, wherein the response-inducing means may be in the form of a button that can be clicked or touched by the user, in the form of a sentence requesting the user to directly input information such as letters, numbers, images, etc., or in the form of a picture requesting the user to directly input information such as letters, numbers, images, etc. Such examples as described above are merely a means for helping understanding, and any means capable of inducing an action of the user as a response on the messenger may be included in the concept of the above response-inducing means.

If the user responds according to the response-inducing means, the messenger server 700 may recognize the response as a final permission for accessing the user by the identification system 300 and output a response message (S80). The response message may include: a case where the messenger server 700 recognizes the click of a response-inducing means button as "permission" of the response message output by the request of the identification system 300 and thus outputs a response message including the identification indicator (I) as a user message; and another case where the user directly inputs and outputs the response message.

The administrator of the identification system 300 may request the user to upload a review through general connection information such as a user ID or a phone number. When the user purchases a first product and a second product in a shopping mall having at least one external server 400 using the user terminal 100, the product is shipped from the shopping mall and the at least one external server 400 transmits the product order information to the identification system 300. The identification system 300 always monitors the delivery information. When delivery is completed (S10), the identification system 300 transmits an initial review request message to the user (S40). The initial review request message may be directly transmitted by the identification system 300 to the user terminal 100 through the messenger server 700. Alternatively, the identification system 300 may request another organization to transmit the initial review request message to the user terminal 100.

The user may check the initial review request message in the messenger executed on the user terminal 100, and may determine whether to approve the review request. When the user approves the request (S70), the identification system 300 inquires the information on the product ordered by the user, in addition, lists the purchased products that have been delivered to the user in the past and transmits the same to the user terminal 100 (S95).

According to the present invention, the user can view the products purchased by the user on the messenger channel and, if there is a video or photo recorded for each product, may select a product intended to share the corresponding data and upload the data as a review for the product.

However, there is a case where the messenger server 700 randomizes the user's unique key (K) value. A random number refers to a number generated without a rule within a predetermined range, and randomly forming a string of characters or numbers may be defined as randomization. More clearly, randomization is that the identification system 300 converts the user's unique key (K) value into a character string (or numeric string) which corresponds to the previously known user's unique key (K) value but includes information entirely unconnected thereto. Accordingly, only the messenger server 700 can know who the user corresponds to the random number-processed user key value, while the identification system 300 cannot know who the user sent the response message even when the user's response message is transmitted.

Figure 4:
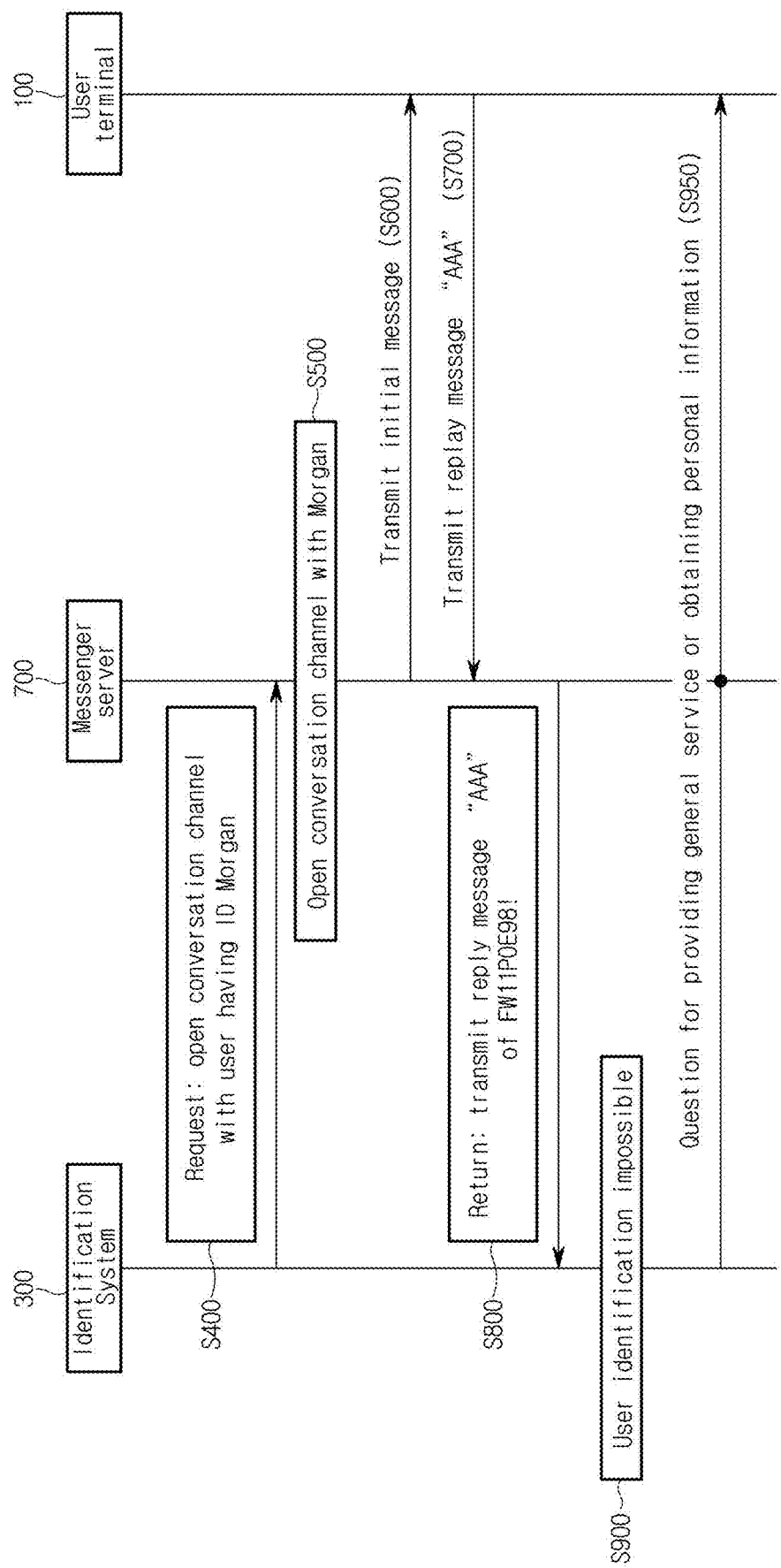
FIG. 4 is a flowchart illustrating a method by which a conventional chatbot acquires information from a conversation partner ("counterpart").

For example, referring to FIG. 4, on a messenger service that randomizes a user's unique key (K) value, the identification system 300 requests the messenger server 700 to open a conversation channel with a user whose ID is "Morgan" (S400) and, even if the user terminal 100 writes and sends AAA as a reply message (S700), the messenger server 700 processes the user ID "Morgan" as a random number and returns it as a random string such as FW11P0E98! (S800). Therefore, it is impossible for the identification system 300 to determine that the owner of the message is "Morgan" based on the ID-like information of FW11P0E98! (S900). As a result, the identification system 300 cannot provide a service in consideration of the user's characteristics, but must ask a general question or request to re-enter personal information in order to confirm who the user is.

Figure 5:
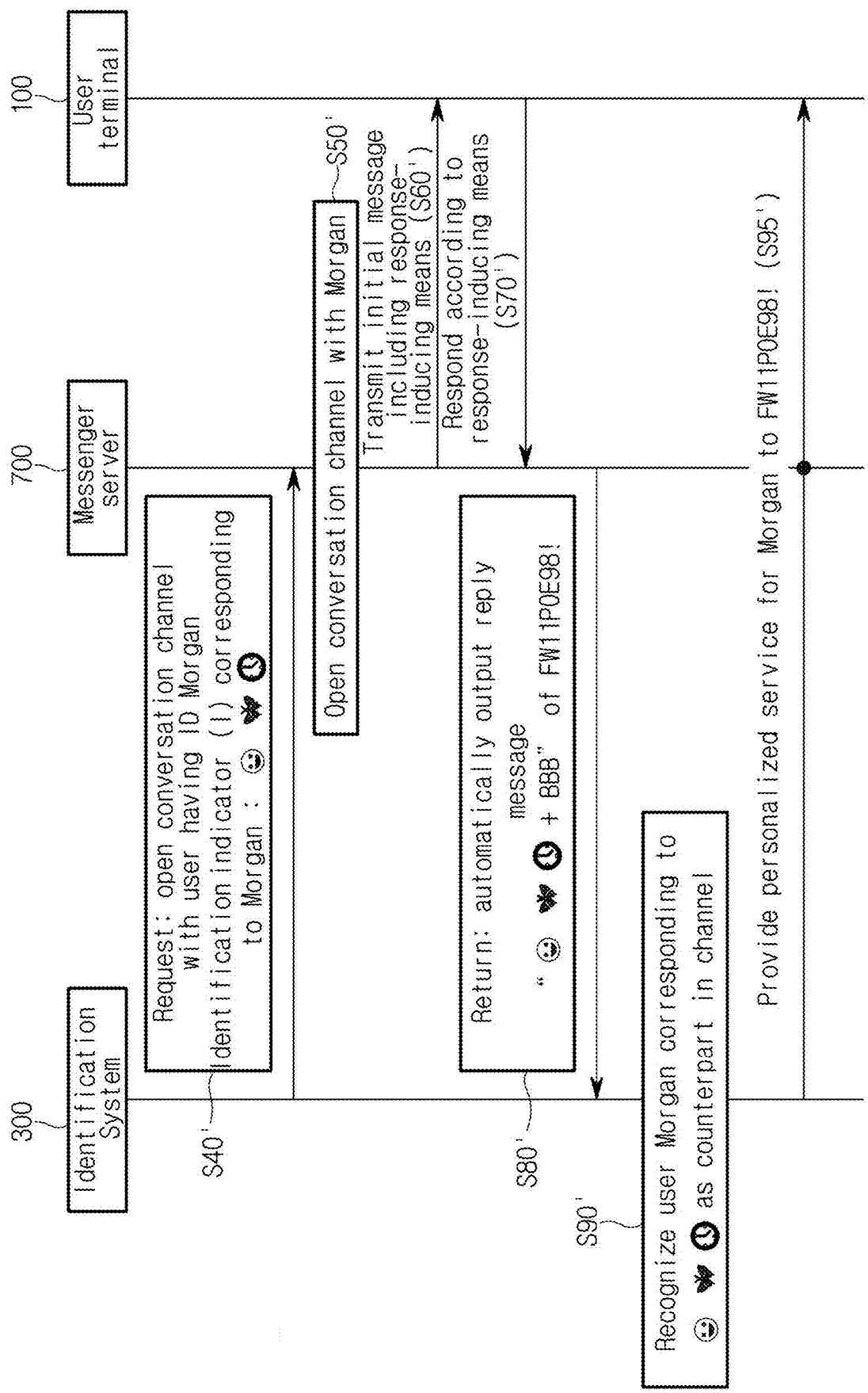
FIG. 5 is a flowchart illustrating a process of which the chatbot identifies a counterpart user according to an embodiment of the present invention.

However, referring to FIG. 5, even if using a messenger service that randomizes a user's unique key (K) value,— provided that, when the identification system 300 requests the messenger server 700 to open a conversation channel with a user whose ID is "Morgan" (S400), transmission of an initial message is requested after defining an identification indicator (I) corresponding to "Morgan" (S40'), and the user clicks or touches a button which is one of the response-inducing means (S70') so that the identification indicator (I) icons in the form of a smile, butterfly and clock designated in advance by the identification system 300 can be output as a response message—, the identification system 300 can determine that the owner of the message is "Morgan" based on the above icons newly matched to ID-like information of an arbitrary character string such as FW11P0E98! (S90') even when the messenger server 700 randomly processes the user ID "Morgan" into the arbitrary character string FW11P0E98! and sends the message (S80'). Accordingly, in this case, the identification system 300 may provide a personalized service in consideration of the user's characteristics (S95'). For example, if the communication unit 310 receives an action signal indicating that the user has received the most recently purchased product while the identification system 300 already has information in which the user has purchased products from several shopping malls, the communication unit may request the user to upload a review of the products having purchased in the past such as text messages, videos, etc. as well as the recently purchased product. Such shopping information may be provided in the personalized form individually and differently for each user, so that the user can very comfortably use the service provided by the identification system 300.

For a messenger that executes randomization on a user key value, in an embodiment of the present invention, when the user approves the review request (S70'), the messenger server 700 may return the randomized user key value to the identification system 300 and grant a right to access the channel (S80'). The messenger server 700 may add the identification indicator (I) to a first message of the user and then output the same.

Since the identification indicator (I) is output in the user's first message, the identification system 300 utilizes the relationship information between the user—the query code (Q)—the identification indicator (I) stored in advance so as to confirm who the user is in the channel.

Accordingly, the identification system 300 may transmit a list of purchased products to the user, and the user may simply select (e.g., touch or click) a product to review and upload a review image or text.

In terms of protecting personal information or strengthening security, there is increased trend that some messengers do not share a value for identifying a user. Therefore, adopting insertion of the identification indicator (I) into a user message can accurately identify who the user is, thereby providing a personalized service.

In the case of a messenger that does not execute randomization on a user's key value, in an embodiment of the present invention, the process of returning the randomized user's key value would not be performed whereby the identification system 300 does not have a difficulty in specifying the user. Accordingly, a process of transmitting the query code (Q) and outputting a user message including the identification indicator (I) by the identification system 300 may be omitted.

Figure 6:
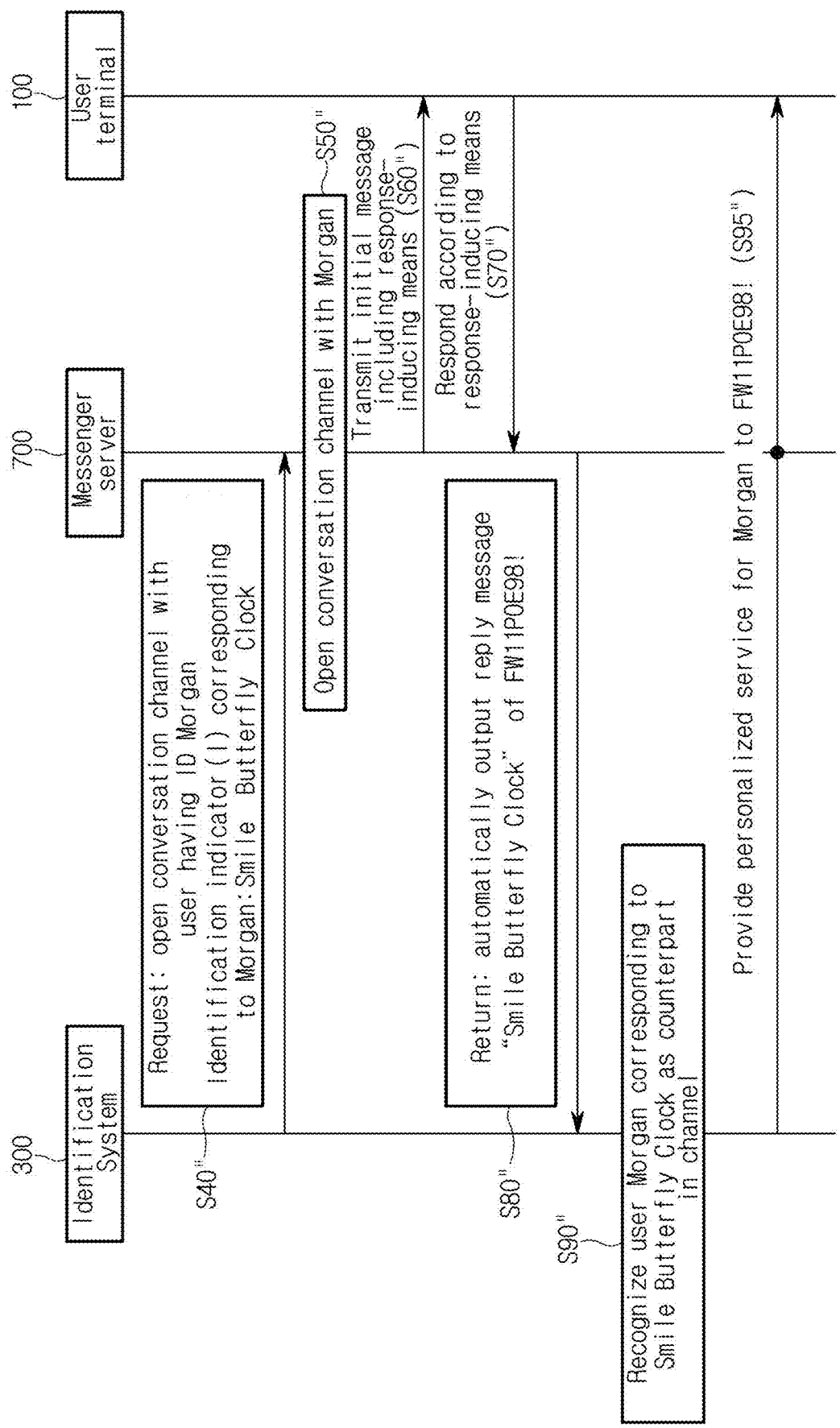
FIG. 6 is another flowchart illustrating a process of which the chatbot identifies a counterpart user according to an embodiment of the present invention.

In an embodiment, a response message may be directly input by the user. Referring to FIG. 6, even if using a messenger service that randomizes a user's unique key (K) value,—provided that, when the identification system 300 requests the messenger server 700 to open a conversation channel with a user whose ID is "Morgan" (S400), transmission of an initial message including character, symbol, number, etc. as a query code (Q) is requested after defining an identification indicator (I) corresponding to "Morgan" (S40") into the above character, symbol, number, etc., and the user reads the above query code (Q) and inputs the identification indicator (I) in the form of a smile, butterfly and clock characters (S70") so that a response message including the identification indicator (I) in the form of the smile, butterfly and clock characters designated in advance by the identification system 300 can be output—, the identification system 300 can determine that the owner of the message is "Morgan" based on the above icons regardless of ID-like information of an arbitrary character string such as FW11P0E98! (S90") even when the messenger server 700 randomly processes and converts the user ID "Morgan" into the arbitrary character string FW11P0E98! (S80"). Accordingly, in this case, the identification system 300 may provide a personalized service in consideration of the user's characteristics (S95").

Figure 7:
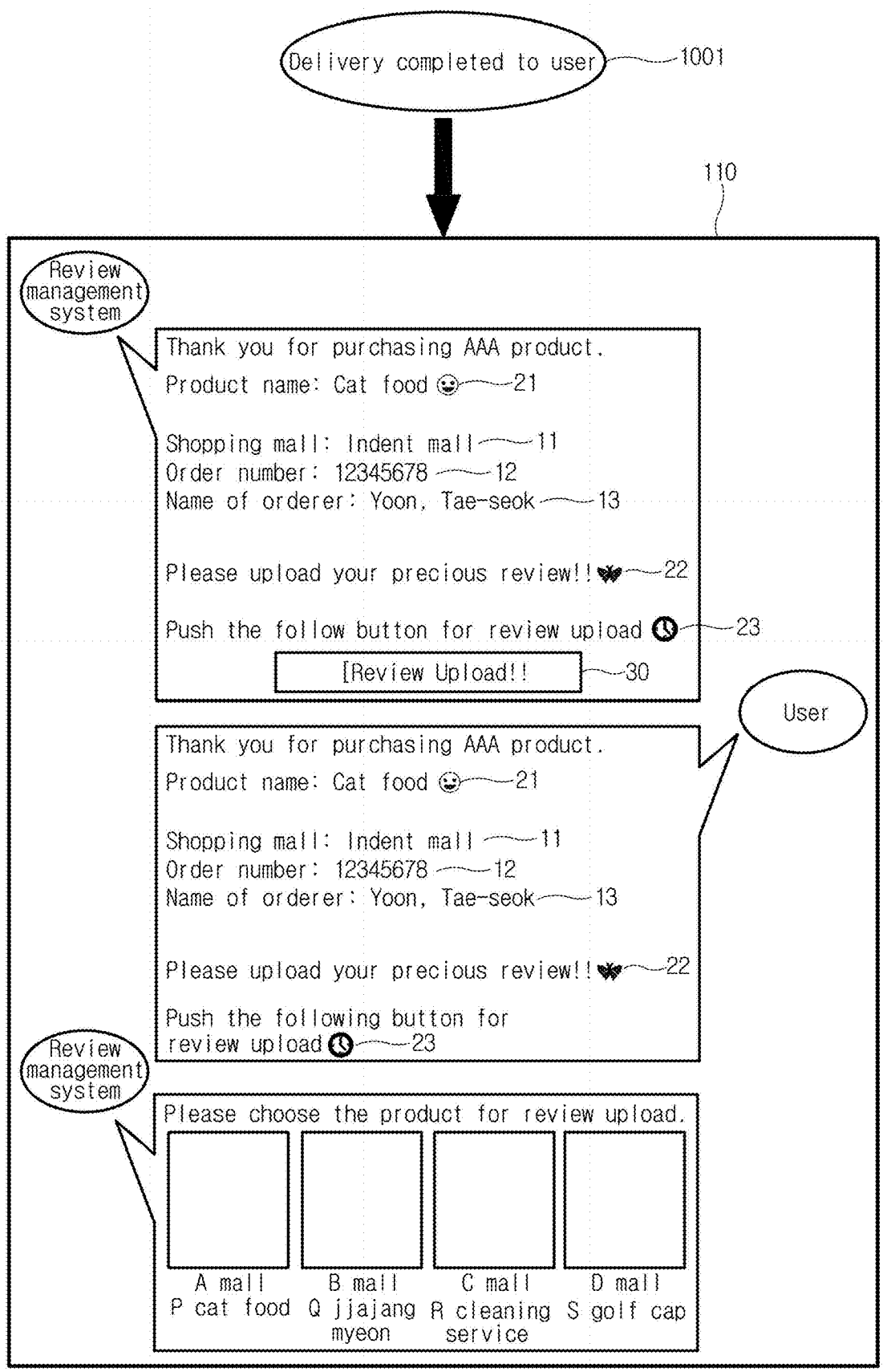
FIG. 7 is a diagram illustrating a process of user identification proceeding in a user terminal when the identification system according to an embodiment of the present invention receives delivery completion information as a user action signal.

FIG. 7 is a diagram illustrating a process of performing user identification in a user terminal when the identification system according to an embodiment of the present invention receives delivery completion information as a user action signal.

In this regard, the delivery completion information 1001 is one of the user action signals 1000 by which the user identification procedure implemented by the identification system 300 according to an embodiment of the present invention is started.

The identification system 300 may monitor delivery information for a corresponding product after receiving product order information. When the confirmation unit 322 receives the delivery completion information, the identification system 300 may send an initial message for requesting a review (S40). In this case, the initial message may include a query code (Q).

When the user approves the review request included in the initial message (S70), a chatbot execution unit 323 may output an identification indicator (I) corresponding to the query code (Q) on a conversation (or chat) window of the user through mediation of the messenger server 700.

The query code (Q) and the identification indicator (I) may be the same character, symbol or picture to each other. In this case, the chatbot execution unit 323 may directly copy the message of the identification system 300 including the query code (Q) as it is and attach the copied message in the chat window of the user terminal 100, so as to acquire the identification indicator (I).

In an embodiment, each of the query code (Q) and the identification indicator (I) may be any one among a plurality of pieces of information constituting the product purchase information or a combination of the plurality of pieces of information.

The identification indicator (I) may be, for example, a combination of a shopping mall 11, an order number 12, a name of the orderer 13, etc. Further, the identification indicator (I) may be, for example, a combination of a smile 21, a butterfly 22, a clock 23, etc. Alternatively, it may be a set in which each of the above elements is selected and combined again.

In an embodiment, the query code (Q) and the identification indicator (I) may be different characters, symbols, pictures, and the like. In this case, the identification indicator (I) created in advance in response to the user may be copied in the user chat window as it is.

In an embodiment, the generation unit 321 may designate a parameter function for connecting the query code (Q) and the identification indicator (I). That is, when the query code (Q) is exposed in the chat window on the side of the identification system 300, the parameter function may immediately create or search an identification indicator (I) corresponding to the query code (Q) and then output the same in the chat window on the side of the user terminal 100 instead of copying or simply outputting the corresponding identification indicator (I) on the side of the user terminal 100.

The identification system 300 may inquire product order information and list the products that have been delivered. Thereafter, the identification system 300 may transmit the list to the user, and the user may select a product and upload a review for the selected product.

The chatbot of the identification system 300 may open a channel through specific information such as a user's phone number at opening a channel. That is, in the stage of sending the first message, any user is under identification.

However, from the moment the user starts to reply, the user's identification value is displayed as randomized. Therefore, if the identification system 300 is configured to output the query code (Q) to the message at the system side and the identification indicator (I) to the message at the user side, respectively, it is always possible to specify who the corresponding user is by the presence of the identification indicator (I) in the channel during the following conversation—while the channel is maintained.

If the user wishes to upload a review, he (she) can touch a review upload button, that is, an approval button 30, and a programmed message is outputted to the user's message window immediately upon touch. In this regard, in the message window of the user, several identification indicators (I), that is, a shopping mall 11, an order number 12, an orderer's name 13, a smile 21, a butterfly 22, and a clock 23, etc. may be displayed. This is one of the methods preprogrammed in the chatbot. The identification system 300 may recognize the above identification indicators (I) (or an optional combination thereof), and may utilize the database for every conversation within the channel so as to specify a user corresponding to the above recognized result.

As such, after specifying the user, the chatbot may inquire information on the orders for products that have been delivered and searched for delivery, and then show the list of products for review to the user. As shown in FIG. 7, regardless of the origin of the products purchased by a specific user such as P cat food purchased at Mall A, Q Jajangmyeon purchased at Mall B, R cleaning service purchased at Mall C, and S golf cap purchased at Mall D, and the like, all reviews may be uploaded in one channel.

Figure 8:
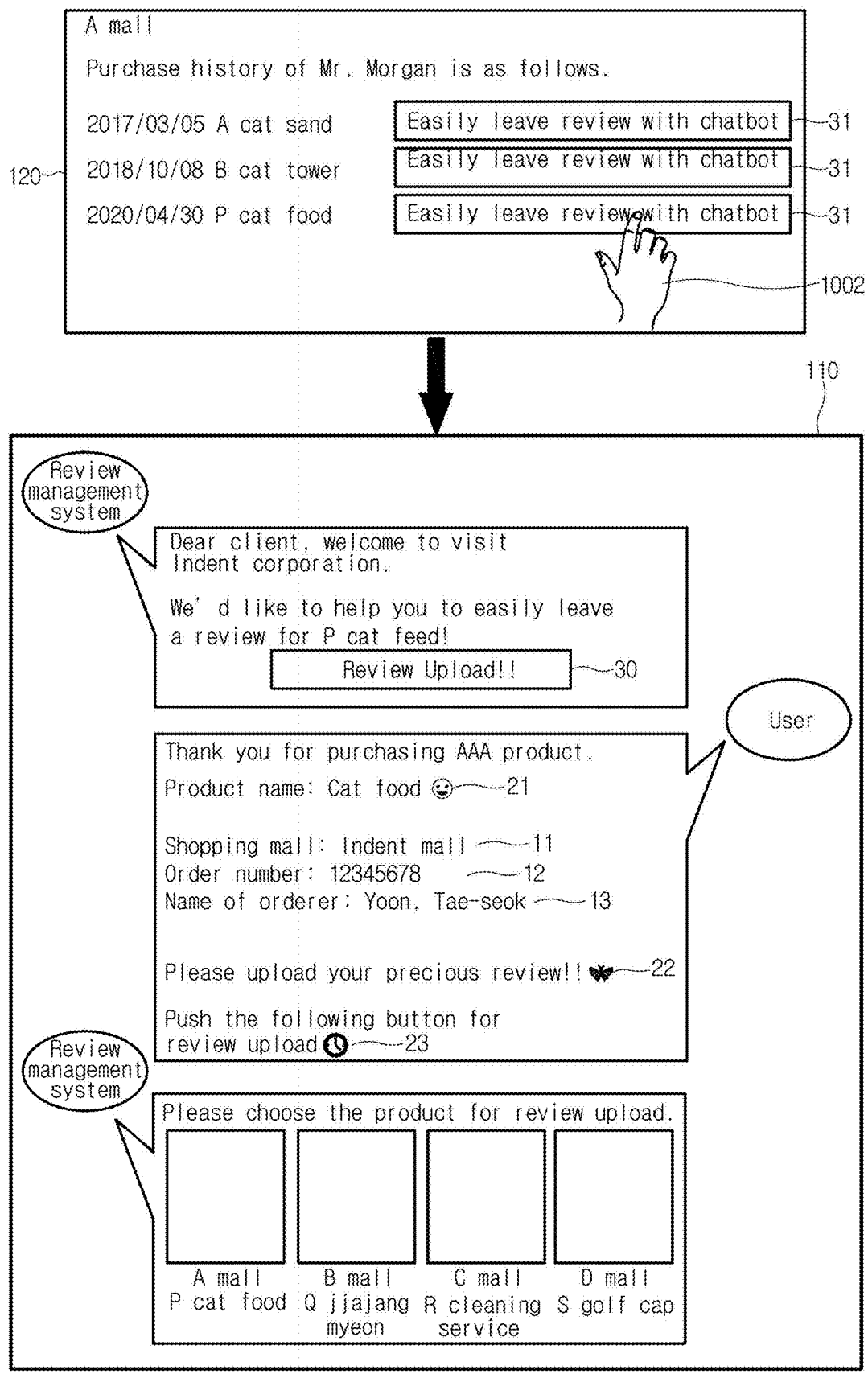
FIG. 8 is a diagram illustrating a process of user identification proceeding in a user terminal when the identification system according to an embodiment of the present invention receives a user click action on an external website as a user action signal.

FIG. 8 is a diagram illustrating a process of user identification in a user terminal when the identification system according to an embodiment of the present invention receives a user click action on an external website as a user action signal.

Herein, the user action signal 1000 is a signal that the user clicked or touched a first button 31 in a second terminal 120. That is, an action 1002 of the user clicking or touching the first button 31 to easily leave a review with the chatbot on the screen of the second terminal 120 is recognized as the user action signal 1000 and thus an initial message is transmitted.

When "leaving a review" for cat food P is touched, a messenger is executed on a user terminal screen 110 and an initial message of the identification system (review management system) is output. Further, when the user touches a response-inducing button 30 included in the initial message, a pre-prepared response message may automatically output a smile (picture) (21), etc., which is an identification indicator (I). Since the identification indicator (I) has been obtained from the user FW11P0E98!, the identification system 300 may now recognize FW11P0E98! as Morgan and respond thereto.

Figure 9:
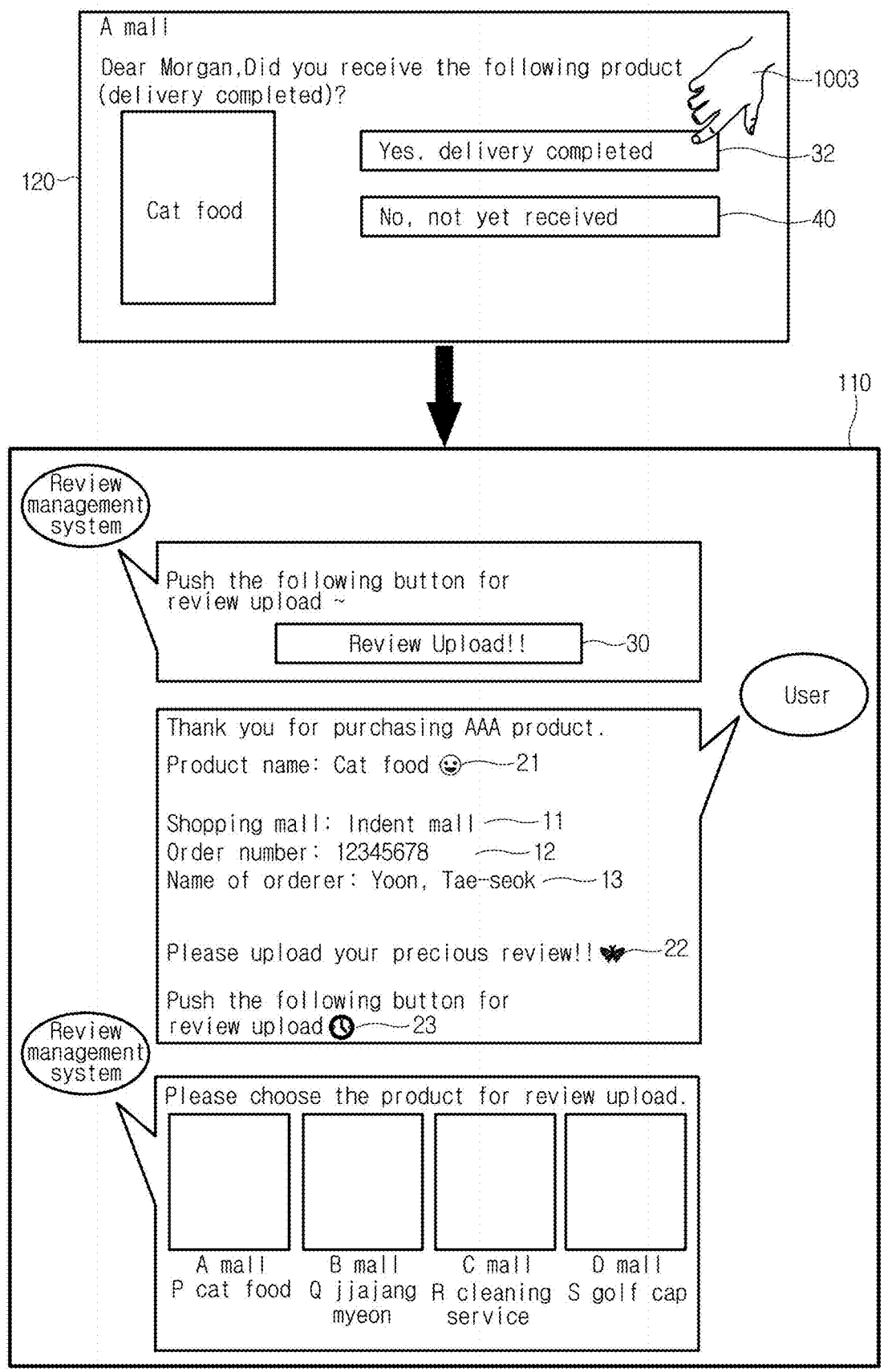
FIG. 9 is another diagram illustrating a process of user identification proceeding in a user terminal when the identification system according to an embodiment of the present invention receives a user click action on an external website as a user action signal.

FIG. 9 is another diagram illustrating a process of user identification in a user terminal when the identification system according to an embodiment of the present invention receives a user click action on an external website as a user action signal.

Herein, the user action signal 1000 is a signal that the user clicked or touched a second button 32 in the second terminal 120. That is, an action 1003 of the user clicking or touching the second button 32 related to delivery completion on the screen of the second terminal 120 is recognized as the user action signal 1000 and thus an initial message is transmitted.

When touching the second button 32 related to delivery completion, a messenger is executed on the user terminal screen 110 and the initial message of the identification system (review management system) is output. Further, when the user touches the response-inducing button 30 included in the initial message, a pre-prepared response message may automatically output a smile (picture) (21), etc., which is an identification indicator (I). Since the identification indicator (I) has been obtained from the user FW11P0E98!, the identification system 300 may now recognize FW11P0E98! as Morgan and respond thereto.

FIG. 10 is a diagram illustrating an embodiment in which the identification system of FIG. 8 receives an identification indicator as a user message without automatically outputting a response message.

Herein, the user action signal 1000 is a signal that the user clicked or touched the first button 31 in the second terminal 120. That is, an action 1002 of the user clicking or touching the first button 31 to easily leave a review with the chatbot on the screen of the second terminal 120 is recognized as the user action signal 1000 and an initial message is transmitted.

The initial message shows "Smile Butterfly Clock" as an example, and may include a phrase requesting input of the same text as in the example. "Smile Butterfly Clock" is a query code (Q) and, in this case, is the same as the identification indicator (I).

If the user correctly inputs the phrase "Smile Butterfly Clock" according to the request of the identification system 300, the identification system 300 may accurately specify the user, thereby providing a personalized service.

The above-described method for identifying a counterpart of a chatbot-based messenger according to an embodiment of the present invention may be performed by a program included in a platform or operation system, may be performed by a program downloadable online, or may be run in a program state stored in a storage medium. In this regard, the above-described method for identifying a counterpart of a chatbot-based messenger according to an embodiment of the present invention may be implemented through a program installed by default on a computer or directly installed by a user, and may be recorded in a computer-readable recording medium such as a terminal.

The embodiments according to the present invention described above may be implemented in the form of program instructions that can be executed through various computer components and recorded in a computer-readable recording medium. The computer-readable recording medium may include program instructions, data files, data structures, etc. alone or in combination. The program instructions recorded on the computer-readable recording medium may be specially designed and configured for the present invention, or may be known and available to those skilled in the art of computer software. Examples of computer-readable recording media include hard disks, magnetic media such as floppy disks and magnetic tapes, optical recording media such as CD-ROMs and DVDs, and magneto-optical media such as floptical disks, and hardware devices specially configured to store and execute program instructions, such as ROM, RAM, flash memory, and the like. Examples of program instructions include not only machine language codes such as those generated by a compiler, but also high-level language codes that can be executed by a computer using an interpreter or the like. A hardware device may be altered into one or more software modules to perform processing in accordance with the present invention, and vice versa.

Although the present invention has been described as above, those of ordinary skill in the art to which the present invention pertains will recognize that the present invention may be implemented in other forms while maintaining the technical spirit and essential features of the present invention.

The scope of the present invention will be defined by the claims, but all changes or modifications derived from configurations directly derived from the claims, as well as configurations equivalent thereto, should also be interpreted to be included in the scope of the present invention.

What is claimed is:

1. A method for identifying a counterpart of a messenger, comprising:
    receiving an action signal of a user from the outside;
    reading user information related to the user from a database;
    determining an initial message and a response message including an identification indicator for identifying the user, based on the user information by a processor;
    requesting a messenger server to open a conversation channel, in which the user is designated as a counterpart, to transmit the initial message and to output the response message;
    receiving the response message by the communication unit;
    checking the identification indicator output in the received response message and specifying a person corresponding to the identification indicator as the counterpart by the processor; and the messenger server returning a unique key associated with the counterpart,
    wherein the unique key is generated using random number processing,
    wherein the unique key is not associated with a specific user,
    wherein the identification indicator is information specifying the user and includes different values designated for respective persons, and
    wherein, based on the initial message being transmitted, the response message including the identification indicator is a message at the user side which is automatically output on the conversation channel in response thereto, and wherein the response message is output based on receipt of particular user input, and
    wherein the identification indicator is unique to the counterpart.

2. The method according to claim 1, wherein the determination of the response message includes: constructing a data combination capable of identifying the user among the user information; designating the identification indicator corresponding to the data combination; and generating the initial message and then determining the content of the response message including the identification indicator.

3. The method according to claim 2, wherein the step of designating the identification indicator further includes designating a query code corresponding to the data combination, wherein the identification indicator corresponds to the query code.

4. The method according to claim 3, wherein the initial message includes the query code, while the response message includes the identification indicator corresponding to the query code.

5. The method according to claim 1, wherein the action signal is a signal indicating online that a predetermined user action has been completed.

6. The method of claim 1, wherein the particular user input comprises user selection of a button in the initial message or entry of particular input information identified in the initial message.

7. A system for identifying a counterpart of a messenger, comprising:
   a database for storing user information and diverse data; and
   a processor configured to execute instructions that cause the processor to:
   determine an initial message and a response message that includes an identification indicator for identifying a user, based on the user information; and
   upon receiving a user action signal from the outside, request a messenger server to open a conversation channel, in which the user is designated as a counterpart, wherein the messenger server transmits the initial message, outputs the response message, and returns a unique key associated with the counterpart,
   wherein the unique key is generated using random number processing,
   where the unique key is not associated with a specific user,
   wherein the identification indicator is information for specifying the user, and includes different values designated to respective users,
   wherein the response message including the identification indicator is a message at the user side which is automatically output on the conversation channel in response to the transmission of the initial message, wherein the response message is output based on receipt of particular user input,
   wherein, based on receiving the response message of the user, the instructions further cause the processor to check the identification indicator output in the received response message so as to specify the user corresponding to the identification indicator as the counterpart, and
   wherein, the communication unit receives randomized character as a key value of the user.

8. The system according to claim 7, wherein, when determining the response message, the processor: constructs a data combination capable of identifying the user among the user information; designates the identification indicator corresponding to the data combination; and generates the initial message, and then, determines the content of the response message including the identification indicator.

9. The system according to claim 8, wherein, when determining the response message, the processor further designates a query code corresponding to the data combination along with the identification indicator, and the identification indicator corresponds to the query code.

10. The system according to claim 9, wherein the initial message includes the query code, while the response message includes the identification indicator corresponding to the query code.

11. The system according to claim 7, wherein the action signal is a signal indicating online that a predetermined user action has been completed.

12. The system of claim 7, wherein the particular user input comprises user selection of a button in the initial message or entry of particular input information identified in the initial message.

13. A method for identifying a counterpart of a messenger, comprising:
   receiving an action signal of a user from the outside;
   reading user information related to the user from a database;
   determining an identification indicator based on the user information by a processor;
   receiving a response message and a unique key associated with the user from outside from a messenger server; and
   checking whether the identification indicator exists in the received response message and, if the identification indication exists, specifying a person corresponding to the identification indicator as the counterpart by the processor,
   where the unique key is not associated with a specific user,
   wherein the identification indicator is information specifying the user and includes different values designated for respective persons,
   wherein, based on the initial message being transmitted, the response message including the identification indicator is a message at the user side which is automatically output on a conversation channel in response thereto, and wherein the response message is output based on receipt of particular user input, and
   wherein the messenger server returns the unique key of the user after random number processing.

14. The method according to claim 13, further comprising: before the step of receiving the response message, requesting a messenger server to open a conversation channel, in which the user is designated as a counterpart, and to transmit an initial message.

15. The method according to claim 14, wherein the determination of the identification indicator is to determine the initial message that includes a query code, as well as the identification indicator corresponding to the query code, based on the user information, by the processor, wherein each of the query code and the identification indicator is information specifying a user and includes different values designated for respective persons.

16. A non-transitory computer readable medium storing instructions that when executed by a system of one or more processors, cause the one or more processors to perform the method of claim 1.

17. A non-transitory computer readable medium storing instructions that when executed by a system of one or more processors, cause the one or more processors to perform the method of claim 13.

* * * * *